US006550920B2

(12) United States Patent
Hosoda et al.

(10) Patent No.: US 6,550,920 B2
(45) Date of Patent: Apr. 22, 2003

(54) LIQUID CRYSTAL PROJECTOR

(75) Inventors: Satoshi Hosoda, Daito (JP); Kenji Yamauchi, Kobe (JP); Kouji Terami, Higashiosaka (JP); Yoshihiko Yano, Kyotanabe (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/930,162

(22) Filed: Aug. 16, 2001

(65) Prior Publication Data

US 2002/0030794 A1 Mar. 14, 2002

(30) Foreign Application Priority Data

Aug. 23, 2000 (JP) .......................................... 2000-252866

(51) Int. Cl.$^7$ ............................................... G03B 21/16
(52) U.S. Cl. .............................. 353/58; 353/57; 353/52
(58) Field of Search ............................. 353/52, 57, 58, 353/122, 85

(56) References Cited

U.S. PATENT DOCUMENTS

| 4,217,039 A | * | 8/1980 | Zellner et al. ............... 353/119 |
| 4,829,327 A | * | 5/1989 | Grunwald .................... 353/101 |
| 6,139,155 A | * | 10/2000 | Takizawa ...................... 353/57 |
| 6,419,364 B2 | * | 7/2002 | Takizawa et al. .............. 353/52 |

* cited by examiner

*Primary Examiner*—Russell Adams
*Assistant Examiner*—Andrew Sever
(74) *Attorney, Agent, or Firm*—Arent Fox Kintner Plotkin & Kahn, PLLC

(57) ABSTRACT

A liquid crystal projector provided with one or a plurality of cooling fans comprises a temperature sensor for sensing the internal temperature of the liquid crystal projector, and a driving control circuit for controlling the driving voltage of the cooling fan on the basis of the temperature sensed by the temperature sensor. A driving control circuit controls the driving voltage of the cooling fan in proportion to the temperature sensed by the temperature sensor in a case where the temperature sensed by the temperature sensor is within a predetermined range.

2 Claims, 2 Drawing Sheets

LIQUID CRYSTAL PROJECTOR

BACKGROUND OF THE INVENTION

1. Field of the Invention

The present invention relates to a liquid crystal projector.

2. Description of the Prior Art

In a casing of a liquid crystal projector, there are provided a liquid crystal panel, a light source lamp for backlight arranged on a rear surface of the liquid crystal panel, a signal processing circuit, and a power supply circuit. A cooling fan for cooling the liquid crystal panel, the light source lamp for backlight, and so on is provided in the casing of the liquid crystal projector. Conventionally, the higher the number of revolutions of the cooling fan is, the more the cooling efficiency is improved. However, noise is increased.

SUMMARY OF THE INVENTION

An object of the present invention is to provide a liquid crystal projector capable of reducing noise produced by a cooling fan.

In a liquid crystal projector provided with one or a plurality of cooling fans, the liquid crystal projector according to the present invention is characterized by comprising a temperature sensor for sensing the internal temperature of the liquid crystal projector; and a driving control circuit for controlling the driving voltage of the cooling fan on the basis of the temperature sensed by the temperature sensor, the driving control circuit controlling the driving voltage of the cooling fan in proportion to the temperature sensed by the temperature sensor in a case where the temperature sensed by the temperature sensor is in a predetermined range.

It is preferable that a temperature sensor used for on-off control of a light source lamp for backlight is used as the temperature sensor.

When two types of fans, that is, a suction fan and an exhaust fan are provided as the cooling fan, the driving voltage controlled by the driving control circuit for the suction fan against the temperature sensed by the temperature sensor and the driving voltage controlled by the driving control circuit for the exhaust fan against the temperature sensed by the temperature sensor may differ from each other.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
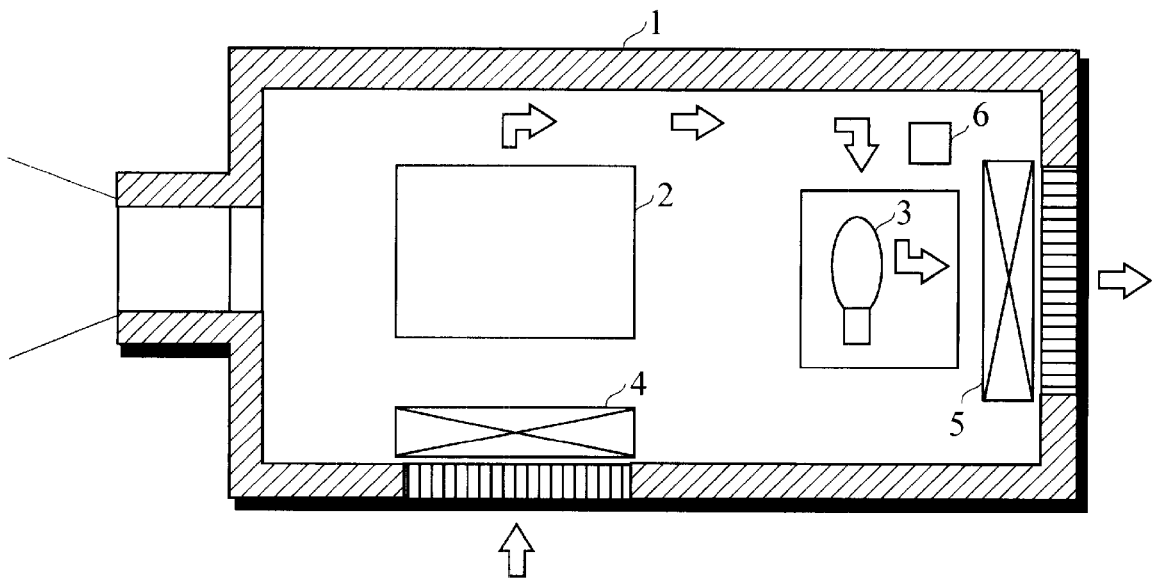
FIG. 1 is a block diagram showing the schematic configuration of a liquid crystal projector.
Figure 2:
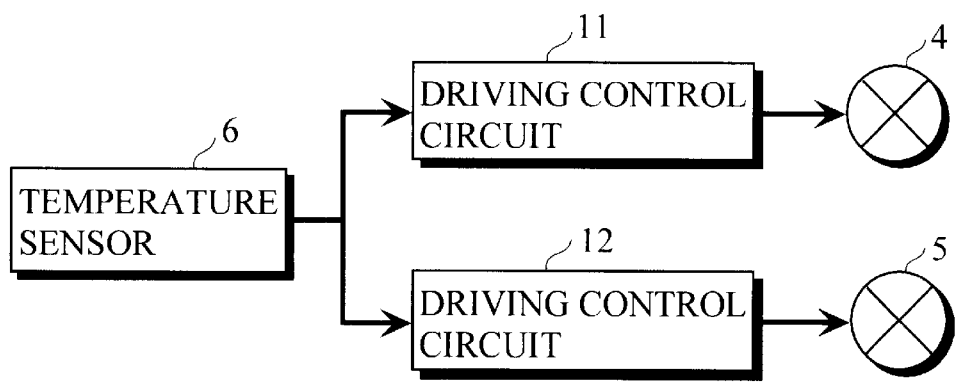
FIG. 2 is a block diagram showing a driving control circuit 11 for a suction fan 4 and a driving control circuit 12 for an exhaust fan 5.
Figure 3:
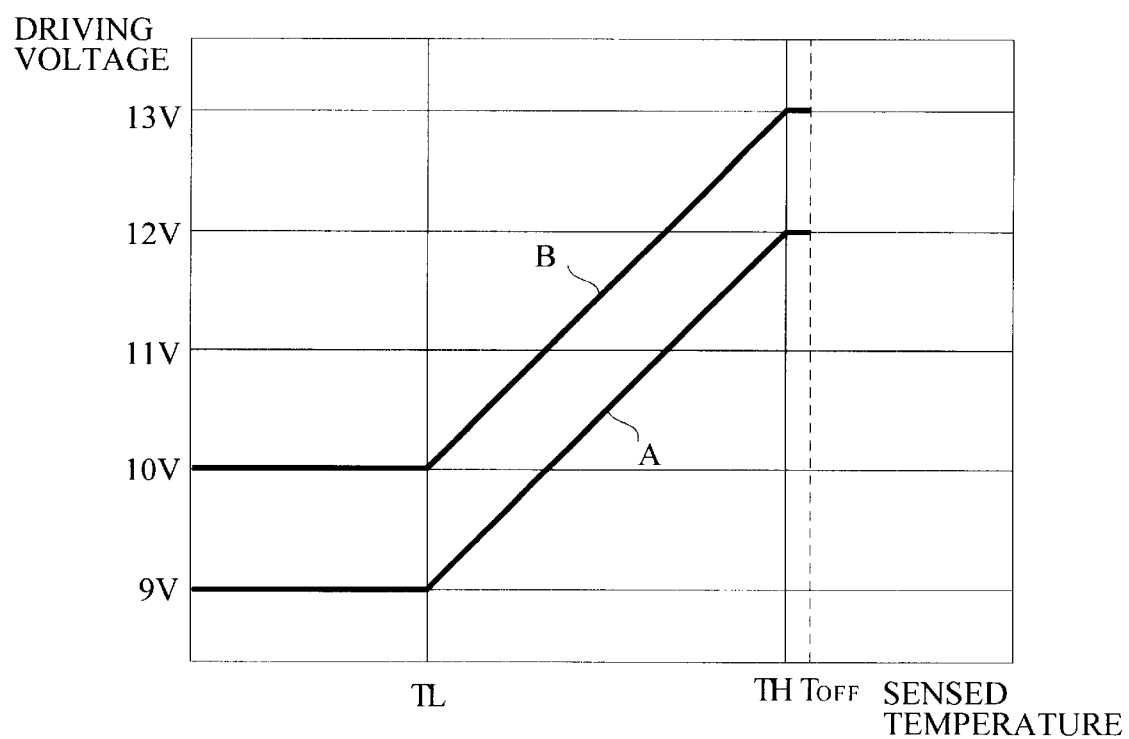
FIG. 3 is a graph showing an example of control of the driving voltage by each of the driving control circuits 11 and 12.

Referring now to FIGS. 1 to 3, an embodiment of the present invention will be described.

FIG. 1 illustrates the schematic configuration of a liquid crystal display device.

A liquid crystal panel 2 is provided in a casing 1 of the liquid crystal display device. A light source lamp for backlight 3 is arranged on the right side (on a rear surface) of the liquid crystal panel 2. A suction fan (a cooling fan) 4 is arranged below the liquid crystal panel 2. An exhaust fan (a cooling fan) 5 is arranged on the right side of the light source lamp for backlight 3.

A temperature sensor 6 for on-off control of the backlight 3 is arranged in the vicinity of the light source lamp for backlight 3 in the casing 1. When the temperature sensed by the temperature sensor 6 is not less than a predetermined set-off temperature, the driving of the light source lamp for backlight 3 is stopped.

In the present embodiment, the respective driving voltages (the respective numbers of revolutions) of the suction fan 4 and the exhaust fan 5 are controlled on the basis of the temperature sensed by the temperature sensor 6.

FIG. 2 illustrates a driving control circuit 11 for the suction fan 4 and a driving control circuit 12 for the exhaust fan 5.

The driving control circuits 11 and 12 respectively control the driving voltages of the suction fan 4 and the exhaust fan 5 on the basis of the temperature sensed by the temperature sensor 6.

FIG. 3 illustrates an example of control of the driving voltage by each of the driving control circuits 11 and 12.

A polygonal line A shown in FIG. 3 indicates an example of control of the driving voltage of the suction fan 4 by the driving control circuit 11 for the suction fan 4.

Specifically, when the temperature T sensed by the temperature sensor 6 is not more than TL, the driving control circuit 11 controls the driving voltage of the suction fan 4 to 9 volts. When the temperature T sensed by the temperature sensor 6 is more than TL and less than TH, the driving control circuit 11 controls the driving voltage of the suction fan 4 such that it becomes a value proportional to the sensed temperature T between 9 volts and 12 volts. When the temperature T sensed by the temperature sensor 6 is not less than TH and less than a set-off temperature $T_{OFF}$, the driving control circuit 11 controls the driving voltage of the suction fan 4 to 12 volts.

A polygonal line B shown in FIG. 3 indicates an example of control of the driving voltage of the exhaust fan 5 by the driving control circuit 12 for the exhaust fan 5.

Specifically, when the temperature T sensed by the temperature sensor 6 is not more than TL, the driving control circuit 12 controls the driving voltage of the exhaust fan 5 to 10 volts. When the temperature T sensed by the temperature sensor 6 is more than TL and less than TH, the driving control circuit 12 controls the driving voltage of the exhaust fan 5 such that it becomes a value proportional to the sensed temperature T between 10 volts and 13 volts. When the temperature T sensed by the temperature sensor 6 is not less than TH and less than the set-off temperature $T_{OFF}$, the driving control circuit 11 controls the driving voltage of the exhaust fan 5 to 13 volts.

As described in the foregoing, the driving control circuits 11 and 12 for the fans 4 and 5 respectively control, when the temperature T sensed by the temperature sensor 6 is within a predetermined range, the driving voltages of the fans 4 and 5 such that they are values proportional to the sensed temperature T. Accordingly, noise produced by each of the fans 4 and 5 can be reduced, as compared with that in a case where the driving voltage is always fixed to its maximum voltage.

In the present embodiment, a temperature sensor which has been conventionally provided in order to carry out on-off control of the light source lamp for backlight 3 in the liquid crystal projector is utilized as the temperature sensor 6 used for controlling the driving voltage of each of the fans 4 and 5. Accordingly, a temperature sensor need not be newly provided in order to control the driving voltage of each of the fans 4 and 5.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A liquid crystal projector provided with a suction fan and an exhaust fan, comprising:

a temperature sensor for sensing an internal temperature of the liquid crystal projector;

a first driving control circuit for controlling a driving voltage of the suction fan on the basis of the temperature, sensed by the temperature sensor; and a second driving control circuit for controlling a driving voltage of the exhaust fan on the basis of the temperature sensed by the temperature sensor, wherein each of the driving control circuits controls the driving voltage of the suction fan and the exhaust fan, respectively, in proportion to the temperature sensed by the temperature sensor where the temperature sensed is in a predetermined range, and the driving voltage controlled by the first driving control circuit against the temperature sensed by the temperature sensor and the driving voltage controlled by the second driving control circuit against the temperature sensed by the temperature sensor differ from each other.

2. The liquid crystal projector according to claim 1, wherein the temperature sensor is used for an on-off control of the light source lamp for backlight.

\* \* \* \* \*